United States Patent [19]

Kubo et al.

[11] Patent Number: 4,768,399
[45] Date of Patent: Sep. 6, 1988

[54] FOUR WHEEL DRIVE POWER TRANSMISSION SYSTEM WITH CLUTCH BETWEEN CENTRAL TORQUE NON BALANCED DIFFERENTIAL DEVICE AND ONE WHEEL PAIR

[75] Inventors: Seitoku Kubo; Yutaka Taga; Kunio Morisawa, all of Toyota, Japan

[73] Assignee: Toyota Jidosha Kabushiki Kaisha, Toyota, Japan

[21] Appl. No.: 903,243

[22] Filed: Sep. 3, 1986

[30] Foreign Application Priority Data

Sep. 3, 1985 [JP] Japan ................ 60-194635

[51] Int. Cl.$^4$ .......................................... F16H 1/44.5
[52] U.S. Cl. .................... 74/710.5; 74/714; 180/249
[58] Field of Search ............ 74/710, 740, 665 T, 74/714, 710.5; 180/248, 249, 250

[56] References Cited

U.S. PATENT DOCUMENTS

| | | | |
|---|---|---|---|
| 3,828,877 | 8/1974 | Fogelberg | 180/249 |
| 3,941,199 | 3/1976 | Williams | 180/44 R |
| 3,963,085 | 6/1976 | Vinton | 180/44 R |
| 4,074,591 | 2/1978 | Dick | 74/714 X |
| 4,298,085 | 11/1981 | Moroto et al. | 180/249 |
| 4,552,241 | 11/1985 | Suzuki | 180/249 |
| 4,566,554 | 1/1986 | Suzuki | 180/249 |

FOREIGN PATENT DOCUMENTS

| | | |
|---|---|---|
| 2125628 | 12/1972 | Fed. Rep. of Germany . |
| 2300343 | 7/1973 | Fed. Rep. of Germany ..... 74/710.5 |
| 2747786 | 4/1978 | Fed. Rep. of Germany . |
| 3036068 | 5/1981 | Fed. Rep. of Germany . |
| 3311309 | 10/1984 | Fed. Rep. of Germany . |
| 47-203 | 5/1972 | Japan . |
| 55-72420 | 5/1980 | Japan . |
| 83617 | 6/1980 | Japan .................. 180/248 |
| 58-29519 | 2/1983 | Japan . |

OTHER PUBLICATIONS

Patent Abstracts of Japan, vol. 9, No. 92 (M-373), [1815], 20th Apr. 1985; & JP-A-59 216 766 (Nissan Jidosha K.K.), 6/12/84.

Primary Examiner—Leslie A. Braun
Assistant Examiner—Dwight G. Diehl
Attorney, Agent, or Firm—Oblon, Fisher, Spivak, McClelland & Maier

[57] ABSTRACT

In a four wheel drive power transmission system for an automotive vehicle, including a planetary gear mechanism wherein the carrier, the ring gear and the sun gear thereof operate as a power input member, a first power output member for driving either of a pair of front wheels or a pair of rear wheels and a second power output member for driving the other of the pair of front wheels and the pair of rear wheels, respectively, the planetary gear mechanism being selectively locked to rotate as a unitary rotational member, a clutch is incorporated in a rotational power transmitting system for rotationally connecting the ring gear with either the pair of front wheels or the pair of rear wheels so as selectively to intercept the rotational power transmitting system between, wherein the first power output member provides hundred percent front or rear wheel drive when operated with the planetary gear mechanism being locked, while the second power output member provides high percentage opposite rear or front wheel drive when the planetary gear mechanism is not locked.

1 Claim, 3 Drawing Sheets

FOUR WHEEL DRIVE POWER TRANSMISSION SYSTEM WITH CLUTCH BETWEEN CENTRAL TORQUE NON BALANCED DIFFERENTIAL DEVICE AND ONE WHEEL PAIR

BACKGROUND OF THE INVENTION

The present invention relates to a four wheel drive power transmission system, and more particularly relates to such a four wheel drive power transmission system for a vehicle such as an automobile adapted for four wheel drive operation, in which the construction is improved so as to better provide a variety of operational modes.

The present invention has been described in Japanese Patent Application Ser. No. 60-194635 (1985), filed by an applicant the same as the entity assigned or owed duty of assignment of the present patent application; and the present patent application hereby incorporates into itself by reference the text of said Japanese Application and the claims and the drawings thereof; a copy is appended to the present application.

Further, the present inventors wish hereby to attract the attention of the examining authorities to their copending patent applications Ser. Nos. 06/903,241 and 06/903,239, which may be considered to be material to the examination of the present patent application, and which are coowned with or are subject to obligations of coassignment together with the present patent application.

There are various types of known four wheel drive power transmission systems for automotive vehicles. One such type is the so called "part time" four wheel drive power transmission system, in which a clutch provided in a transfer device for four wheel drive is used to switch the transmission system between a four wheel drive mode and a two wheel drive mode; such a part time four wheel drive power transmission system is, for example, disclosed in Japanese Utility Model Laying Open Publication Ser. No. 58-29519 (1983). On the other hand, another type of four wheel drive power transmission system is the so called "full time" four wheel drive power transmission system, in which a clutch provided in a central differential device for four wheel drive is used to switch said central differential device between a first operational mode in which it provides differential action between the combination of the front wheels of the vehicle and the combination of the rear wheels of the vehicle, and a second operational mode in which it does not provide any such differential action, but instead drives said front wheel combination and said rear wheel combination individually, i.e. by effectively connecting these combinations together. Such a full time four wheel drive power transmission system is, for example, disclosed in Japanese Utility Model Laying Open Publication Ser. No. 47-203 (1972) and also in Japanese Patent Application Ser. No. 53-145857 (1978), which has been laid open to the public as Japanese Patent Laying Open Publication Ser. No. 55-72420 (1980).

Further, there has already been disclosed in the aforesaid Japanese Patent Application Ser. No. 53-145857 (1978), laid open as Japanese Patent Laying Open Publication Ser. No. 47-72420 (1980), a four wheel drive power transmission system having, in addition to a differential clutch which as mentioned above can selectively put the central differential device into a locked state or a free state, also a power transmission control clutch which carries out switchover between two wheel drive operation and four wheel drive operation, and such that the vehicle driving state may be switched over between three types of operational state, to wit: central differential action type four wheel drive (in which the central differential device is operational to provide differential action), central differential non action four wheel drive (in which the central differential device is locked up), and two wheel drive.

The problem which occurs with these prior arts is the following. It is known that generally in a four wheel drive vehicle such as an automobile it is preferable, for straight ahead steering stability during high speed driving, for the vehicle drive to be performed all or largely by the front wheels of the vehicle, with the rear wheels providing only a subsidiary amount of drive or no drive at all. On the other hand, for starting off from rest and for climbing inclines such as hills it is preferable for the vehicle to be performed, contrariwise, all or largely by the rear wheels of the vehicle, with the front wheels providing only a subsidiary amount of drive or no drive at all. And, further, for driving on slippery surfaces such as wet roads, snow, or mud it is desirable to perform four wheel driving with the central differential device set to the locked up state for definitely powering both the front wheels and the rear wheels, even in the case of slippage of one of said wheel pairs.

However, in the above outlined prior art variable drive type four wheel drive systems, since conventionally the cental differential device is a so called balanced distribution type differential device which includes a bevel gear mechanism, such as is conventionally used as a differential device for providing differential action between two coaxial wheels of a conventional automobile, even if the above described differential clutch, which as mentioned above can selectively put the central differential device into a locked state or a free state, and the above described power transmission control clutch, which carries out switchover between two wheel drive operation and four wheel drive operation, are operated independently, nevertheless the drive torque distribution ratio between the front and the rear wheels can only be changed between the two values of 50%-50% and 100%-0% or 0%-100%, and thus, even if one of front wheel emphasis drive and rear wheel emphasis drive can be performed, they cannot both be performed in the case of any one configuration. That is to say, if the power transmission control clutch is provided in the power transmission path to the front wheels of the vehicle, then two wheel driving by means of the rear wheels only can successfully be performed, but front wheel emphasis drive cannot be performed at all; whereas, if power transmission control clutch is provided in the power transmission path to the rear wheels of the vehicle, then two wheel driving by means of the front wheels only can successfully be performed, but rear wheel emphasis drive cannot be performed at all.

SUMMARY OF THE INVENTION

The inventors of the present invention have considered the various problems detailed above in the aforementioned type of four wheel drive power transmission system construction, from the point of view of the desirability of being able to provide both front wheel emphasis drive and rear wheel emphasis drive for one and the same vehicle, according to operational circumstances.

Accordingly, it is the primary object of the present invention to provide an improved four wheel drive power transmission system of the general type described above, which avoids the problems detailed above.

It is a further object of the present invention to provide such a four wheel drive power transmission system, which can provide both front wheel emphasis drive and rear wheel emphasis drive for the vehicle to which it is fitted.

It is a yet further object of the present invention to provide such a four wheel drive power transmission system, which provides an operational mode which provides an appropriate torque distribution between the front and the rear vehicle wheels for providing good straight ahead stability for operating the vehicle in normal operational circumstances.

It is a yet further object of the present invention to provide such a four wheel drive power transmission system, which provides an operational mode which functions well for providing an appropriate torque distribution between the front and the rear vehicle wheels for providing starting off from rest and for climbing inclines such as hills or slopes.

It is a yet further object of the present invention to provide such a four wheel drive power transmission system, which provides an operational mode which gives an appropriate torque distribution between the front and the rear vehicle wheels for providing good driving in slippery conditions, as for example on a bad road surface or in mud, rain, or snow.

It is a yet further object of the present invention to provide such a four wheel drive power transmission system, which maximizes service life and reliability.

It is a yet further object of the present invention to provide such a four wheel drive power transmission system, which is easy to assemble and economical to manufacture.

According to the most general aspect of the present invention, these and other objects are attained by a four wheel drive power transmission system for a vehicle with an engine, a pair of front wheels, and a pair of rear wheels, comprising: (a) a power distribution device for four wheel drive, comprising: (a1) a rotational power input shaft driven from said engine; (a2) a first rotational power output shaft; (a3) a second rotational power output shaft rotationally coupled to a one of said pairs of wheels; and: (a4) a selectively controllable differential means for selectively either: (a41) driving said first rotational power output shaft and said second rotational power output shaft individually from said rotational power input shaft, without providing any differential action between said first and said second rotational power output shafts; or: (a42) driving said first rotational power output shaft and said second rotational power output shaft from said rotational power input shaft, while providing differential action between said first and said second rotational power output shafts, and while distributing a substantially larger proportion of input torque to one of said first rotational power output shaft and said second rotational power output shaft than to the other; and: (b) a means for selectively either rotationally coupling said first rotational power output shaft to the other of said pairs of wheels or decoupling said first rotational power output shaft from said other of said pairs of wheels. And, optionally but preferentially, it may be said first rotational power output shaft to which said differential means, when providing differential action, distributes a substantially larger proportion of input torque, rather than to said second rotational power output shaft.

According to such a four wheel drive power transmission system as specified above, as the cental differential device for the vehicle is utilized a differential device—the power distribution device for four wheel drive—which is of a non torque balanced distribution type, because when providing differential action between said first and said second rotational power output shafts it distributes a substantially larger proportion of input torque to one of said first rotational power output shaft and said second rotational power output shaft than to the other. And a power transmission control clutch—the means for selectively either rotationally coupling or decoupling said first rotational power output shaft to the other of said pairs of wheels—is provided, preferably between the one of the output shafts of said power distribution device for four wheel drive which preferentially receives more torque in the differential action providing operational mode, and its driven wheels. Accordingly, when the differential control clutch—incorporated in said selectively controllable differential means for controlling it either to provide or not to provide differential action—is released so as to allow differential action of said selectively controllable differential means, and when the power transmission control clutch is engaged, under the effect of said central differential device, with a drive torque distribution ratio determined by the characteristics of said central differential device and not 50%-50%, four wheel drive vehicle driving is carried out by four wheel drive with, for example, rear wheel emphasis drive, so as to be suitable for starting off or for climbing an incline such as a hill; but on the other hand, when the differential control clutch is engaged so as to prevent differential action of said selectively controllable differential means, and when the power transmission control clutch is released, vehicle driving is carried out by two wheel drive with, for example, only the front wheels of the vehicle being driven, so as to be suitable for straight ahead driving in normal vehicle operational circumstances; and, finally, when the differential control clutch is engaged so as to prevent differential action of said selectively controllable differential means, and when also the power transmission control clutch is engaged, vehicle driving is carried out by four wheel drive in the differential locked up mode, with both the front and the rear wheels of the vehicle being driven and with no differential action being provided between them, so as to be suitable for operation of the vehicle on wet or slippery roads or in snow or mud.

Further, it may be either the case that it is said second rotational power output shaft which is rotationally coupled to said pair of rear wheels, while said first rotational power output shaft is rotationally coupled to said pair of front wheels via said selective rotational coupling means, or alternatively that it is said first rotational power output shaft which is rotationally coupled to said pair of rear wheels, while said second rotational power output shaft is rotationally coupled to said pair of front wheels via said selective rotational coupling means. Yet further, acccording to another particular specialization of the present invention, the above specified and other objects may be more particularly attained by a four wheel drive power transmission system as specified above, further comprising a means for selectively either rotationally coupling said second rotational power output shaft to said one of said pairs of wheels or decoupling said second rotational power output shaft from said one of said pairs of wheels. According to such a four wheel drive power transmission system as specified above, even more flexibility in driving is obtained, as will become clear from the following descriptions.

BRIEF DESCRIPTION OF THE DRAWINGS

The present invention will now be described with respect to the preferred embodiments thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts unless otherwise specified; like reference numerals, unless otherwise so specified, denote the same parts and gaps and spaces and so on in the various figures relating to one preferred embodiment, and like parts and gaps and spaces and so on in the figures relating to different preferred embodiments; and:

DESCRIPTION OF THE PREFERRED EMBODIMENTS

Figure 1:
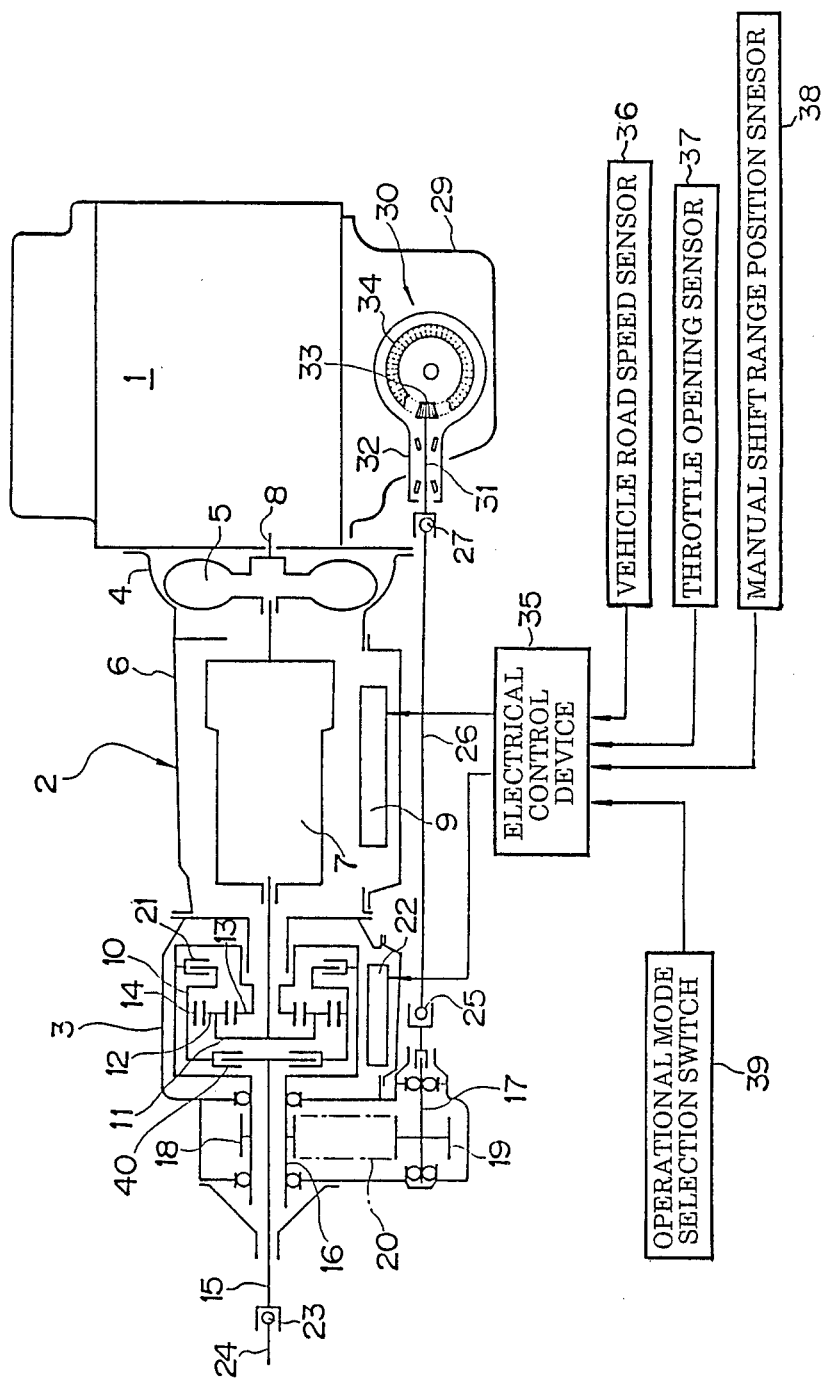
FIG. 1 is a longitudinal schematic skeleton view of a vehicle power train which incorporates the first preferred embodiment of the four wheel drive power transmission system of the present invention.

The present invention will now be described with reference to the preferred embodiments thereof, and with reference to the figures. FIG. 1 is a longitudinal schematic skeleton view of a vehicle power train which incorporates the first preferred embodiment of the four wheel drive power transmission system of the present invention. In this figure, the reference numeral 1 denotes an internal combustion engine of said vehicle, which is mounted, in this exemplary case, longitudinally in the front engine room (not particularly shown) of said vehicle. And the reference numeral 2 denotes an automatic speed change device (automatic transmission) of a per se known type, while 3 denotes a four wheel drive power transfer device.

In more detail, the automatic speed change device 2 incorporates a fluid torque converter 5 of a per se known construction, and the power input shaft (not particularly shown) of this fluid torque converter 5 is connected to and receives rotational power from a crank shaft (not shown either) of the internal combustion engine 1. And the fluid torque converter 5 is housed within a torque converter housing 4 fitted against and secured to the main body of the internal combustion engine 1, while the automatic speed change device 2 comprises a gear transmission mechanism 7, which is likewise housed within a speed change device housing 6 fitted against and secured to the torque converter housing 4. And the input shaft (not particularly shown) of the gear transmission mechanism 7 is connected to and receives rotational power from the power output shaft (not shown either) of the fluid torque converter 5; and thereby the gear transmission mechanism 7 receives rotational power from the internal combustion engine 1, with a certain degree of slippage and also torque amplification being provided for said rotational power by the fluid torque converter 5 as is per se conventional. This gear transmission mechanism 7 may for the purposes of this specification be of a per se known type incorporating various planetary gear mechanisms and friction engaging mechanisms such as clutches and brakes, and according to selective actuation of said friction engaging mechanisms provided by a hydraulic control mechanism 9 of a per se known sort provides any one of a plurality of speed reduction stages between its said power input shaft and its said power output shaft.

The four wheel drive power transfer device 3 incorporates a central differential device 10 of a planetary gear wheel type for providing differential action between the front wheels of the vehicle and the rear wheels of the vehicle during the full time four wheel drive operation for which this four wheel drive power transmission system is adapted. This central differential device 10 is of a planetary mechanism torque non balanced type incorporating a planetary gear power differentiating mechanism; in other words the torques which it provides at its two output sides are not the same. Now the detailed construction of this central differential device 10 will be explained. It comprises a sun gear 13, a ring gear 14, a carrier 11, and a plurality of planetary pinions 12 rotatably mounted to said carrier 11 and meshed between the sun gear 13 and the ring gear 14 and performing planetary movement between them in a per se known manner. The carrier 11 functions as an input member for this central differential device 10, and is rotationally connected to the output shaft of the gear transmission mechanism 7 via a shaft which passes through the central axis of the hollow sun gear 13. The ring gear 14, in this first preferred embodiment, functions as one or a first power output member for the central differential device 10 for supplying power to the rear wheels of the vehicle, and is rotationally connected, via a first rotational power transmitting system including drive torque control clutch 40 which will be described hereinafter, to a rear wheel power output shaft 15 which extends out of the four wheel drive power transfer device 3 in the direction to the left as seen in FIG. 1, i.e. towards the rear of the vehicle in this particular exemplary implementation. The drive torque control clutch 40 is selectively operated to be engaged or to be disengaged by a hydraulic control device 22. And the sun gear 13 functions as another or second power output member for the central differential device 10 for supplying power to the front wheels of the vehicle, and said sun gear 13 is rotationally connected to a second rotational power transmitting system including sleeve shaped intermediate front wheel drive shaft 16 via a drum member fitted around the planetary mechanism as a whole. This intermediate front wheel drive shaft 16 is hollow and is fitted around the portion of the rear wheel power output shaft 15 which lies within the housing of this four wheel drive power transfer device 3, and on its outside there is fixedly mounted a sprocket wheel 18. An endless chain 20 is fitted around this sprocket wheel 18 and another sprocket wheel 19 provided below (and to one side of) said sprocket wheel 18 (fron the point of view of the figure and in the actual vehicle body also) and with its central axis substantially parallel to the central axis of said sprocket wheel 18. The sprocket wheel 19 is fixedly mounted on a front wheel power output shaft 17, one end of which protrudes from the housing of this four wheel drive power transfer device 3 in the leftwards direction in the figure, i.e. towards the front end of the vehicle in this particular exemplary implementation.

Further, within the four wheel drive power transfer device 3 there is provided a hydraulically operated type clutch 21, which selectively either rotationally locks or connects together the sun gear 13 and the ring gear 14, or alternatively allows said members to rotate freely with respect to one another. This clutch 21, like the drive torque control clutch 40 as mentioned above, is selectively operated to be engaged or to be disengaged by the aforesaid hydraulic control device 22. Accordingly, the four wheel drive power transfer device 3, which receives rotational power input from the gear transmission mechanism 7 and outputs said rotational power to the rear wheel power output shaft 15 and to the front wheel power output shaft 17, can be caused either to provide differential action for distributing said rotational power between said rear wheel power output shaft 15 and said front wheel power output shaft 17, or not to provide any such differential action and just to drive both of said shafts 15 and 17 directly from its power input shaft connected to the power output shaft of the gear transmission mechanism 7.

When the clutch 21 is not thus engaged by the hydraulic control device 22, so that the central differential device 10 is free to provide its differential action, said central differential device 10 provides output torques at the rear wheel power output shaft 15 and the front wheel power output shaft 17 determined by the number of teeth on the sun gear 13 and the ring gear 14, assuming that the sprocket 18 and the sprocket 19 have the same number of teeth. In fact, if the symbol Rg is used to represent the ratio of the number of teeth on the sun gear 13 to the number of teeth on the ring gear 14 - and this value Rg is naturally between unity and zero since the ring gear 14 natually has more teeth than does the sun gear 13—then the rear wheel torque distribution ratio Rr is equal to $1/(1+Rg)$, while the front wheel torque distribution ratio Rf is equal to $Rg/(1+Rg)$. Thus, it is seen that according to this construction the drive torque distribution amount for the rear wheels of the vehicle is natually higher than the drive torque distribution amount for the front wheels of the vehicle.

Via a universal joint 23 of a per se known sort, the rear end of the rear wheel power output shaft 15 rotationally drives the front end of a rear wheel propeller shaft 24.

And, via a universal joint 25 also of a per se known sort, the front end of the rear wheel power output shaft 15 rotationally drives the rear end of a front wheel propeller shaft 26. Thus, the front wheel propeller shaft 26 extends alongside and generally below the automatic speed change device 2 including the fluid torque converter 5 therein, roughly parallel to the longitudinal axis thereof. The front end of this front wheel propeller shaft 26 is rotationally connected, via another universal joint 27 also of a per se known sort, to the rear end of a drive pinion shaft 31, which constitutes the power input shaft of a front differential device 30. This drive pinion shaft 31 is rotatably supported from a differential casing 32 of the front differential device 30, which is formed integrally with the oil pan 29 of the internal combustion engine 1, by means of two tapered roller bearings.

At the other end of the drive pinion shaft 31, which is supported from the housing 32 of the differential device by the tapered roller bearing, i.e. at its inner end, there is provided a bevel gear drive pinion 33, and this bevel gear drive pinion 33 is on the side of the internal combustion engine 1 from a ring gear 34 of the front differential device 30, and is constantly meshed with said ring gear 34. The ring gear 34 is fitted to a differential housing and together with this differential housing is rotatably supported from the oil pan 29 of the internal combustion engine. The internal arrangements of the front differential device 30 and the front wheel driving arrangements for the vehicle are not particularly shown in the figures and will not be particularly discussed herein because they are not particularly relevant to the present invention; suffice it to say that within the housing of said front differential device 30 there is fitted a differential gear wheel mechanism, the output members of which are left and right side gear wheels which are rotatably supported within the differential housing, with the left side gear wheel being coupled to a left side power output shaft, while the right side gear wheel is, via a right side intermediate power output shaft, coupled to a right side power output shaft. The left side power output shaft projects leftward out from the housing of the differential device to the outside, and at its end portion it is coupled via a universal joint to a left side drive shaft which transfers rotational power to the left side front wheel of the vehicle, possibly via another universal joint; said left side front wheel and so on are not shown in the figures. On the other hand, the right side intermediate power output shaft passes right through the oil pan 29 and projects out therefrom on the other side of said oil pan 29 from the front differential device 30, to be there coupled at its outer end portion via a universal joint to a right side drive shaft, which transfers rotational power to the right side front wheel of the vehicle, possibly via another universal joint; saaid right side front wheel and so on are also not shown in the figures. The left side drive shaft and the right side drive shaft are of substantially the same length.

In the first preferred embodiment of the present invention as generally in the other preferred embodiments to be disclosed hereinafter, the hydraulic control devices 9 and 22 carry out selective switching of the gear transmission mechanism 7, and the clutch 21 and the drive torque control clutch 40 of the central differential device 10, respectively, based upon input signals which they receive from an electrical control device 35 which may include a microcomputer of a per se known type. This electrical control device 35 receives input signals from various sensors and switches, including but not limited to: a vehicle road speed sensor 36, which senses a parameter representing the road speed of the vehicle, and outputs an electronic signal representative thereof; a throttle opening sensor 37, which senses a parameter representing the throttle opening of the internal combustion engine 1 of the vehicle, and outputs an electronic signal representative thereof; a manual shift range position sensor 38, which senses the position of a range setting lever or the like which is manually operated by the driver of the vehicle, and outputs an electronic signal representative thereof; and an operational mode selection switch 39, which also is manually operated by the driver of the vehicle to indicate which of several operational modes (to be described shortly) said driver wishes the vehicle to operate in, and which outputs an electronic signal representative of its set position. And the electrical control device 35, functionally speaking, according to the input signals from the various sensors provided to it including those listed above, outputs a control signal to the hydraulic control device 9 for the gear transmission mechanism 7, so as to control said gear transmission mechanism 7 to be shifted to an appropriate speed stage for the current operational conditions, and also, according to the set position of the operational mode selection switch 39, outputs to the hydraulic control device 22 for the four wheel drive power transfer device 3 a control signal so as to control said hydraulic control device 22 to engage or disengage the clutch 21 and to engage or disengage the drive torque control clutch 40, as appropriate as will be explained shortly. The intimate details of the control program, etc., obeyed by this electrical control device 35, will not be particularly descanted upon herein, because, based upon the functional disclosures thereof provided in this specification, various possibilities will be easily realized by one of ordinary skill in the electronic control art without undue experimentation.

Functionally, then, the operational mode selection switch 39 is provided in the vicinity of the driving seat of the vehicle so as to be easily accessible to the driver, and can be positioned to any one of three positions: a position indicating four wheel drive differential action provided mode; a position indicating four wheel drive differential locked mode; and a position indicating two wheel drive mode.

When the operational mode selection switch 39 is positioned to its position indicating four wheel drive differential action provided operational mode, then the electrical control device 35 controls the hydraulic control device 22 so as to cause said hydraulic control device 22 to disengage the clutch 21 while engaging the drive torque control clutch 40. At this time, the drive torque provided by the gear transmission mechanism 7 is supplied by the central differential device 10 both to the front wheels of the vehicle and to the rear wheels of the vehicle, with the distribution ratio of this drive torque being as described above determined by the ratio Rg of the number of teeth on the sun gear 13 to the number of teeth on the ring gear 14; and, since said value Rg is necessarily less than unity as described above, more drive torque, in this shown and disclosed first preferred embodiment of the present invention, is supplied to the rear wheels of the vehicle via the rear wheel power output shaft 15, than is supplied to the front wheels of the vehicle via the front wheel power output shaft 17. For example, it may be appropriate for 70% of the total drive torque to be transmitted to the rear wheels of the vehicle, while 30% of the total drive torque is transmitted to the front wheels of the vehicle. Therefore, in this four wheel drive differential action provided operational mode, driving of the vehicle is performed principally by the rear wheels thereof; and the torque distribution between the front and the rear wheels provided by this four wheel drive differential action provided operational mode is a suitable torque distribution ratio for starting off from rest and for climbing inclines such as hills or slopes.

On the other hand, when the operational mode selection switch 39 is positioned to its position indicating four wheel drive differential locked operational mode, then the electrical control device 35 controls the hydraulic control device 22 so as to cause said hydraulic control device 22 to engage the clutch 21 while also engaging the drive torque control clutch 40. At this time, the drive torque provided by the gear transmission mechanism 7 is supplied by the central differential device 10, which is now in its locked up state and does not perform differential action, both to the front wheels of the vehicle and to the rear wheels of the vehicle, with the distribution ratio of this drive torque being now equal or 50%-50%. Thus, now, the same torque is supplied to the rear wheels of the vehicle via the rear wheel power output shaft 15, as is supplied to the front wheels of the vehicle via the front wheel power output shaft 17, and 50% of the total drive torque is transmitted to the rear wheels of the vehicle while also 50% of the total drive torque is transmitted to the front wheels of the vehicle. Therefore, in this four wheel drive differential locked operational mode, driving of the vehicle is performed equally by the front and by the rear wheels thereof; and the torque distribution between the front and the rear wheels provided by this four wheel drive differential locked operational mode is a suitable torque distribution ratio for driving in slippery conditions as on a bad road surface or in mud, rain, or snow.

Further, when the operational mode selection switch 39 is positioned to its position indicating two wheel drive operational mode, then the electrical control device 35 controls the4 hydraulic control device 22 so as to cause said hydraulic control device 22 to engage the clutch 21 while disengaging the drive torque control clutch 40. At this time, the drive torque provided by the gear transmission mechanism 7 is passed as before through the central differential device 10 which is in its locked up state and does not perform differential action, but since the drive torque control clutch 40 is now disengaged this drive torque is supplied only to the front wheels of the vehicle and not at all to the rear wheels of the vehicle, with the distribution ratio of this drive torque being now absolutely lopsided or 0%-100%. Thus, now, no torque at all is supplied to the rear wheels of the vehicle via the rear wheel power output shaft 15, and all the torque available is supplied to the front wheels of the vehicle via the front wheel power output shaft 17, and the rear wheels of the vehicle provide no driving action while the front wheels of the vehicle perform all the driving action therefor. Therefore, in this two wheel drive operational mode, driving of the vehicle is performed only by the front wheels thereof; and the torque distribution between the front and the rear wheels provided by this two wheel drive operational mode in a suitable torque distribution ratio for normal driving, because it provides good straight ahead stability.

Figure 2:
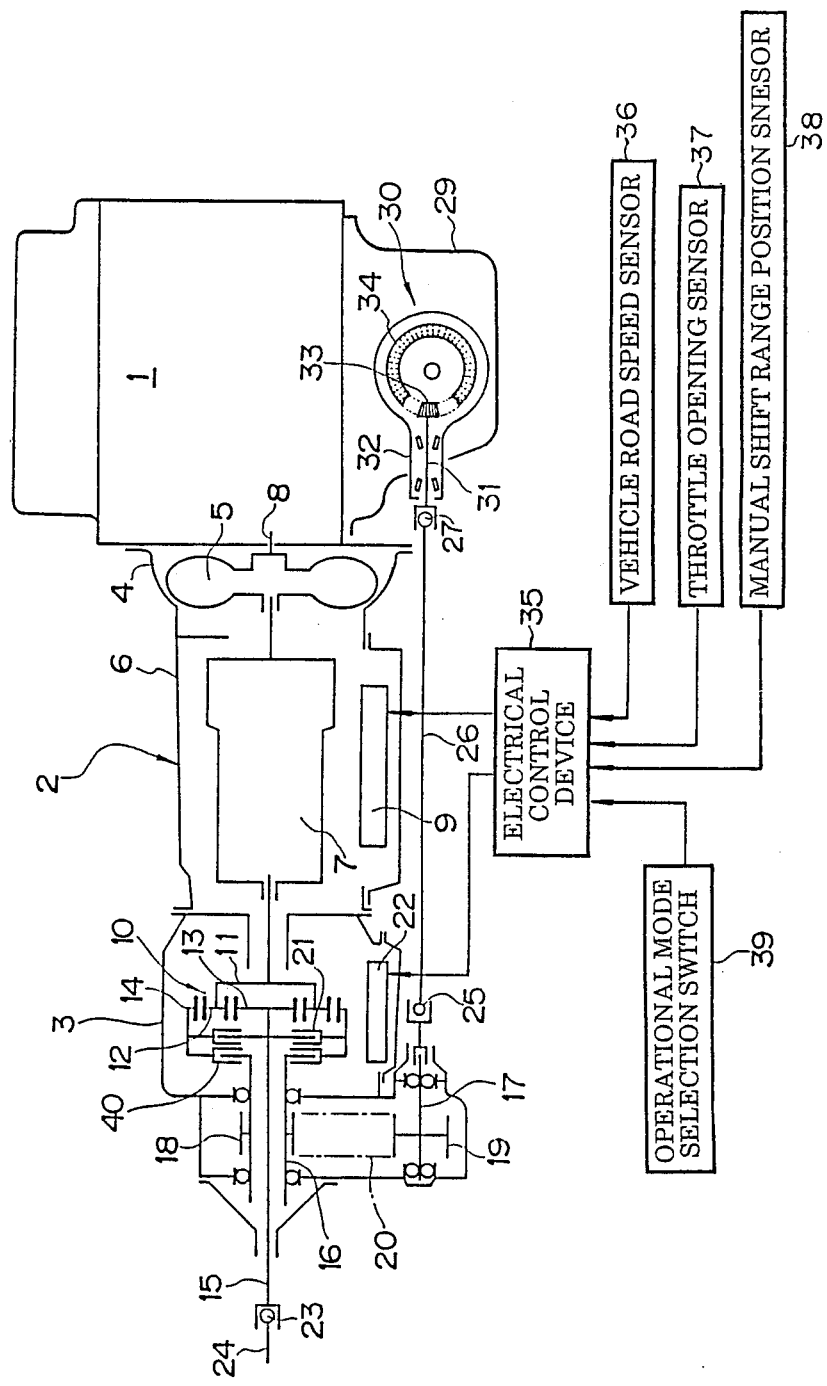
FIG. 2, similarly to FIG. 1 relating to the first preferred embodiment, is a longitudinal schematic skeleton view of a vehicle power train which incorporates the second preferred embodiment of the four wheel drive power transmission system of the present invention.

The second preferred embodiment of the four wheel drive power transmission system of the present invention is shown in longitudinal schematic skeletal view in FIG. 2, in a similar manner to FIG. 1 relating to the first preferred embodiment. In this figure, parts and so on which correspond to analogous parts and so on of the first preferred embodiment are denoted by reference numerals like to those utilized in the figure relating to said first preferred embodiment.

This second preferred embodiment of the four wheel drive power transmission system of the present invention differs from the the first preferred embodiment, in that it is the sun gear 13 of the central differential device 10 which is connected to the rear wheel power output shaft 15, without the interposition of any clutch therebetween, while it is the ring gear 14 that is connected to the front wheel power output shaft 17, with the interposition of the drive torque control clutch 40 between them for selectively either coupling them together or not, according to control by the hydraulic control device 22. Apart from these features, this second preferred embodiment of the four wheel drive power transmission system of the present invention is structured substantially in the same way as the first preferred embodiment described above.

According to the functioning of this second preferred embodiment, when the operational mode selection switch 39 is positioned to its position indicating four wheel drive differential action provided operational mode, then as before the electrical control device 35 controls the hydraulic control device 22 so as to cause said hydraulic control device 22 to disengage the clutch 21 while engaging the drive torque control clutch 40. At this time, the drive torque provided by the gear transmission mechanism 7 is supplied by the central differential device 10 both to the front wheels of the vehicle and to the rear wheels of the vehicle, with the distribution ratio of this drive torque being as described earlier determined by the ratio Rg of the number of teeth on the sun gear 13 to the number of teeth on the ring gear 14, said value Rg being necessarily less than unity, but now being opposite to that described with regard to the first preferred embodiment, so that more drive torque, in this shown and disclosed second preferred embodiment of the present invention, is supplied to the front wheels of the vehicle via the front wheel power output shaft 17, than is supplied to the rear wheels of the vehicle via the rear wheel power output shaft 15. For example, it may now be appropriate for 70% of the total drive torque to be transmitted to the front wheels of the vehicle, while 30% of the total drive torque is transmitted to the rear wheels of the vehicle. Therefore, in this four wheel drive differential action provided operational mode, driving of the vehicle is performed principally by the front wheels thereof; and the torque distribution between the front and the rear wheels provided by this four wheel drive differential action provided operational mode provides excellent staight ahead stability driving characteristics and is very good and suitable for normal driving.

On the other hand, when the operational mode selection switch 39 is positioned to its position indicating four wheel drive differential locked operational mode, then as before the electrical control device 35 controls the hydraulic control device 22 so as to cause said hydraulic control device 22 to engage the clutch 21 while also engaging the drive torque control clutch 40; and, at this time, the drive torque provided by the gear transmission mechanism 7 is supplied by the central differential device 10, which is as in the case of the first preferred embodiment in its locked up state and does not perform differential action, both to the front wheels of the vehicle and to the rear wheels of the vehicle, with the distribution ratio of this drive torque being now equal or 50%-50%. Thus, now, the same torque is supplied to the rear wheels of the vehicle via the rear wheel power output shaft 15, as is supplied to the front wheels of the vehicle via the front wheel power output shaft 17, and 50% of the total drive torque is transmitted to the rear wheels of the vehicle while also 50% of the total drive torque is transmitted to the front wheels of the vehicle. Therefore, in this four wheel drive differential locked operational mode, driving of the vehicle is performed equally by the front and by the rear wheels thereof; and the torque distribution between the front and the rear wheels provided by this four wheel drive differential locked operational mode is a suitable torque distribution ratio for driving in slippery conditions as on a bad road suface or in mud, rain, or snow.

Further, when the operational mode selection switch 39 is positioned to its position indicating two wheel drive operational mode, then the electrical control device 35 controls the hydraulic control device 22 so as to cause said hydraulic control device 22 to engage the clutch 21 while disengaging the drive torque control clutch 40. At this time, the drive torque provided by the gear transmission mechanism 7 is passed as before through the central differential device 10 which is in its locked up state and does not perform differential action, but since the drive torque control clutch 40 is now disengaged this drive torque is supplied only to the rear wheels of the vehicle and not at all to the front wheels of the vehicle, with the distribution ratio of this drive torque being now absolutely lopsided or 100%-0%. Thus, now, no torque at all is supplied to the front wheels of the vehicle via the front wheel power output shaft 17, and all the torque available is supplied to the rear wheels of the vehicle via the rear wheel power output shaft 15, and the front wheels of the vehicle provide no driving action while the rear wheels of the vehicle perform all the driving action therefor. Therefore, in this two wheel drive operational mode, driving of the vehicle is performed only by the rear wheels thereof; and the torque distribution between the front and the rear wheels provided by this two wheel drive operational mode is a suitable torque distribution r atio for starting off from rest and for climbing inclines such as hills or slopes.

Figure 3:
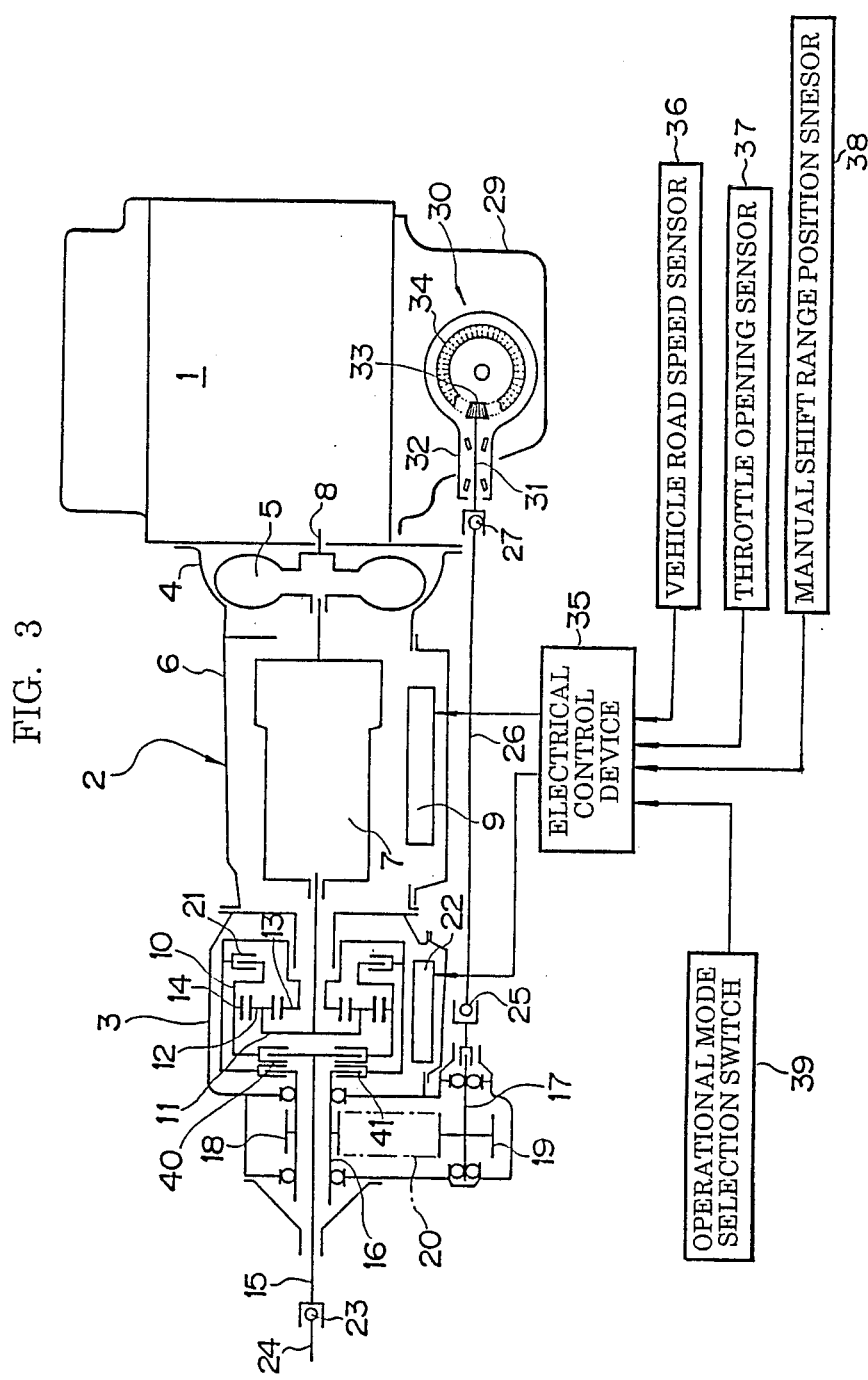
FIG. 3, similarly to FIGS. 1 and 2 relating to the first and second preferred embodiments, is a longitudinal schematic skeleton view of a vehicle power train which incorporates the third preferred embodiment of the four wheel drive power transmission system of the present invention.

The third preferred embodiment of the four wheel drive power transmission system of the present invention is shown in longitudinal schematic skeletal view in FIG. 3, in a similar manner to FIGS. 1 and 2 relating to the first and the second preferred embodiments respectively. In this figure, parts and so on which correspond to analogous parts and so on of the first and the second preferred embodiments are denoted by reference numerals like to those utilized in the figures relating to said first and second preferred embodiments.

In this third preferred embodiment, the option is provided, in the two wheel drive operational mode, of providing either front wheel only driving or rear wheel only driving. Therefore, a construction for the central differential device 10 is utilized, like that of the first preferred embodiment shown in FIG. 1, except that additionally a front wheel drive torque control clutch 41 is provided between the sun gear 13 and the intermediate front wheel drive shaft 16, for selectively either rotationally coupling together these two members or allowing them to rotate freely with respect to one another, as well as the rear wheel drive torque control clutch 40 provided as before between the ring gear 14 and the rear wheel power output shaft 15. According to this, then, functionally, the operational mode selection switch 39 of this third preferred embodiment can be positioned to any one of four positions: a position indicating four wheel drive differential action provided operational mode; a position indicating four wheel drive differential locked operational mode; a position indicating two wheel drive with front wheel only driving operational mode; and a position indicating two wheel drive with rear wheel only driving operational mode.

When the operational mode selection switch 39 is positioned to its position indicating four wheel drive differential action provided operational mode, then the electrical control device 35 controls the hydraulic control device 22 so as to cause said hydraulic control device 22 to disengage the clutch 21 while engaging the rear wheel drive control clutch 40 and also engaging the front wheel drive torque control clutch 41. At this time, the drive torque provided by the gear transmission mechanism 7 is supplied by the central differential device 10 both to the front wheels of the vehicle and to the rear wheels of the vehicle, with the distribution ratio of this drive torque being as in the case of the first preferred embodiment determined by the ratio Rg of the number of teeth on the sun gear 13 to the number of teeth on the ring gear 14; and, since said value Rg is necessarily less than unity as described above, more drive torque, in this shown and disclosed third preferred embodiment of the present invention, is supplied to the rear wheels of the vehicle via the rear wheel drive torque control clutch 40 and the rear wheel power output shaft 15, than is supplied to the front wheels of the vehicle via the front wheel drive torque control clutch 41 and the front wheel power output shaft 17. For example, again, it may be appropriate for 70% of the total drive torque to be transmitted to the rear wheels of the vehicle, while 30% of the total drive torque is transmitted to the front wheels of the vehicle. Therefore, in this four wheel drive differential action provided operational mode, driving of the vehicle is as before performed principally by the rear wheels thereof; and the torque distribution between the front and the rear wheels provided by this four wheel drive differential action provided operational mode is a suitable torque distribution ratio for starting off from rest and for climbing inclines such as hills or slopes.

On the other hand, when the operational mode selection switch 39 is positioned to its position indicating four wheel drive differential locked operational mode, then the electrical control device 35 controls the hydraulic control device 22 so as to cause said hydraulic control device 22 to engage the clutch 21 while also engaging the rear wheel drive control clutch 40 and the front wheel drive torque control clutch 41. At this time, as before in the case of the first preferred embodiment, the drive torque provided by the gear transmission mechanism 7 is supplied by the central differential device 10, which is now in its locked up state and does not perform differential action, both to the front wheels of the vehicle and to the rear wheels of the vehicle, with the distribution ratio of this drive torque being now equal or 50%-50%. Thus, now, the same torque is supplied to the rear wheels of the vehicle via the rear wheel power output shaft 15, as is supplied to the front wheels of the vehicle via the front wheel power output shaft 17, and 50% of the total drive torque is transmitted to the rear wheels of the vehicle while also 50% of the total drive torque is transmitted to the front wheels of the vehicle. Therefore, in this four wheel drive differential locked operational mode, driving of the vehicle is performed equally by the front and by the rear wheels thereof; and the torque distribution between the front and the rear wheels provided by this four wheel drive differential locked operational mode is a suitable torque distribution ratio for driving in slippery conditions as on a bad road surface or in mud, rain, or snow.

Further, when the operational mode selection switch 39 is positioned to its position indicating two wheel drive with front wheel only driving operational mode, then the electrical control device 35 controls the hydraulic control device 22 so as to cause said hydraulic control device 22 to engage the clutch 21 while disengaging the rear wheel drive control clutch 40, and while also engaging the front wheel drive torque control clutch 41. At this time, the drive torque provided by the gear transmission mechanism 7 is passed as before through the central differential device 10 which is in its locked up state and does not perform differential action, but since the rear wheel drive control clutch 40 is now disnegaged this drive torque is supplied only to the front wheels of the vehicle via the front wheel drive torque control clutch 41 which is engaged and via the front wheel power output shaft 17, and not at all to the rear wheels of the vehicle, with the distribution ratio of this drive torque being now absolutely lopsided or 0% - 100%. Thus, now, no torque at all is supplied to the rear wheels of the vehicle via the rear wheel power output shaft 15, and all the torque available is supplied to the front wheels of the vehicle via the front wheel drive torque control clutch 41 and the front wheel power output shaft 17, and the rear wheels of the vehicle provide no driving action while the front wheels of the vehicle perform all the driving action therefor. Therefore, in this two wheel drive with front wheel only driving operational mode, driving of the vehicle is performed only by the front wheels thereof; and the torque distribution between the front and the rear wheels provided by this two wheel drive with front wheel only driving operational mode is a suitable torque distribution ratio for normal driving, because it provides good straight ahead stability.

Finally, when the operational mode selection switch 39 is positioned to its position indicating two wheel drive with rear wheel only driving operational mode, then the electrical control device 35 controls the hydraulic control device 22 so as to cause said hydraulic control device 22 to engage the clutch 21 while also engaging the rear wheel drive control clutch 40, and while now disengaging the front wheel drive torque control clutch 41. At this time, the drive torque provided by the gear transmission mechanism 7 is passed as before through the central differential device 10 which is in its locked up state and does not perform differential action, but since the front wheel drive control clutch 41 is now disengaged this drive torque is supplied only to the rear wheels of the vehicle via the rear wheel drive torque control clutch 40 which is engaged and via the rear wheel power output shaft 15, and not at all to the front wheels of the vehicle, with the distribution ratio of this drive torque being now absolutely lopsided in the contrary direction to the previous one, i.e. being 100% - 0%. Thus, now, no torque at all is supplied to the front wheels of the vehicle via the front wheel power output shaft 17, and all the torque available is supplied to the rear wheels of the vehicle via the rear wheel drive torque control clutch 40 and the rear wheel power output shaft 15, and the front wheels of the vehicle provided no driving action while the rear wheels of the vehicle perform all the driving acction therefor. Therefore, in this two wheel drive with rear wheel only driving operational mode, driving of the vehicle is performed only by the rear wheels thereof; and the torque distribution between the front and the rear wheels provided by this two wheel drive with rear wheel only driving operational mode is a very suitable torque distribution ratio for starting off from rest and for climbing inclines such as hills or slopes, even more suitable than the four wheel drive differential aciton provided operational mode described earlier.

Although the present invention has been shown and described in terms of the preferred embodiment thereof, and with reference to the appended drawings, it should not be considered as being particularly limited thereby, sincce the details of any particular embodiment, or of the drawings, could be varied without, in many cases, departing from the ambit of the present invention. For example, although in the shown preferred embodiments there were disclosed applications of the present invention to four wheel drive vehicle configurations in which the vehicle engine was mounted in a front engine room, alternatively the present invention could be applied to a vehicle with the engine mounted in the rear thereof, i.e. to a rear engined vehicle. In this case, the roles of the front and of the rear propeller shafts should be reversed. Other variations could be envisaged. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. A four wheel drive power transmission system for a vehicle with an engine, a pair of front wheels, and a pair of rear wheels, comprising:

a differential means having a rotational power input member, a first rotational power output member, a second rotational power output member, and a rotational power differentiating mechanism for differentiating a rotational input power supplied to said rotational power input member into a first rotational output power supplied to said first rotational power output member and a second rotational output power supplied to said second rotational power output member with a torque ratio between said first rotational output power and said second rotational output power being substantially larger than one;

a means for selectively locking said differential means so that said rotational power input member, said first rotational power output member and said second rotational power output member rotate in coincidence with one another;

a first rotational power transmitting system for rotationally connecting said first rotational power output member of said differential means with either of said pair of front wheels and said pair of rear wheels;

a second rotational power transmitting system for rotationally connecting said second rotational power output member of said differential means with another of said pair of front wheels and said pair of rear wheels, wherein a clutch is incorporated in said first rotational power transmitting system for selectively terminating rotational power transmission therethrough; and means for controlling said means for selectively locking said differential means and said clutch so that said differential means is locked or not locked while said clutch is engaged or disengaged, respectively, wherein said rotational power differentiating mechanism is a planetary gear mechanism, said rotational power input member being connected with a carrier of said planetary gear mechanism, said first rotational power output member being connected with a ring gear of said planetary gear mechanism, and said second rotational power output member being connected with a sun gear of said planetary gear mechanism, and wherein said means for selectively locking said differential means is a clutch for selectively rotationally connecting said sun gear and said ring gear of said planetary gear mechanism.

* * * * *